(12) United States Patent
Chen et al.

(10) Patent No.: US 6,842,428 B2
(45) Date of Patent: Jan. 11, 2005

(54) METHOD FOR ALLOCATING COMMUNICATION NETWORK RESOURCES USING ADAPTIVE DEMAND PREDICTION

(75) Inventors: Susan Chen, Chandler, AZ (US); Shawn Hogberg, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 787 days.

(21) Appl. No.: 09/756,563

(22) Filed: Jan. 8, 2001

(65) Prior Publication Data

US 2003/0012143 A1 Jan. 16, 2003

(51) Int. Cl.[7] ................................................. H04J 3/16
(52) U.S. Cl. ........................ 370/252; 370/468; 370/337
(58) Field of Search ................................ 370/322, 337, 370/347, 348, 449, 468, 229, 230, 252

(56) References Cited

U.S. PATENT DOCUMENTS

| | | | | |
|---|---|---|---|---|
| 6,038,214 A | * | 3/2000 | Shionozaki | 370/230 |
| 6,269,078 B1 | * | 7/2001 | Lakshman et al. | 370/230 |
| 6,438,141 B1 | * | 8/2002 | Hanko et al. | 370/477 |
| 6,442,138 B1 | * | 8/2002 | Yin et al. | 370/232 |
| 6,449,267 B1 | * | 9/2002 | Connors | 370/347 |
| 6,535,523 B1 | * | 3/2003 | Karmi et al. | 370/468 |
| 6,597,705 B1 | * | 7/2003 | Rezaiifar et al. | 370/468 |
| 6,707,790 B1 | * | 3/2004 | Wu et al. | 370/230 |

* cited by examiner

*Primary Examiner*—Chau Nguyen
*Assistant Examiner*—Christine Ng
(74) *Attorney, Agent, or Firm*—Ingrassia, Fisher & Lorenz P.C.

(57) ABSTRACT

A method for allocating network resources of a communication network (100) to a plurality of users is disclosed. The allocation method includes predicting figure access demand from users and making resource allocation decisions based, at least in part, on the predicted demand.

7 Claims, 1 Drawing Sheet

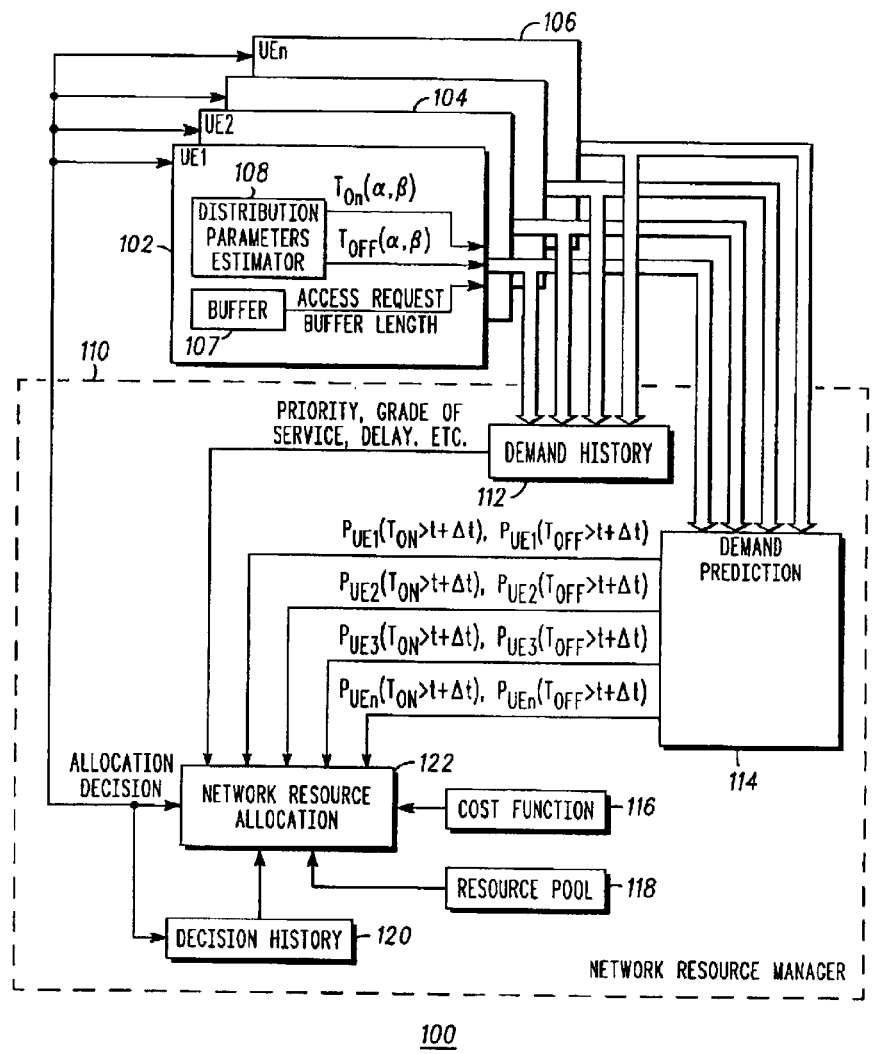

METHOD FOR ALLOCATING COMMUNICATION NETWORK RESOURCES USING ADAPTIVE DEMAND PREDICTION

TECHNICAL FIELD

The present invention relates, generally, to Demand Assigned Multiple Access (DAMA) communication networks and, more particularly, to a method for allocating bandwidth within the network using a prediction of future demand based on parameters associated with current users.

BACKGROUND ART AND TECHNICAL PROBLEMS

Demand Assigned Multiple Access (DAMA) communication networks are particularly useful in network applications where traffic is bursty and where broadband service is required, but is not required constantly. DAMA networks allow for the dynamic allocation and reallocation of bandwidth and network resources based on the communication needs of the network users.

Presently known systems allocate bandwidth based on, inter alia, requests for higher priority service from users. For example, if twenty percent of a network's customers are high-priority users, the network may reserve twenty percent of its bandwidth for high-priority use. If, at any given moment, less than twenty percent of the high-priority bandwidth capacity is being utilized, and a low-priority user requests high-priority service, a typical system would grant that request and allow the low-priority user to consume high-priority network resources, since they are available. This can be problematic, particularly in environments with bursty traffic patterns, because the high-priority network resources employed by tow-priority customers may not be available when needed a short time later by a high-priority user.

A method for allocating network resources is thus needed which is capable of predicting future demand to thereby more efficiently allocate network resources among the competing requests from high-priority and low-priority customers.

BRIEF DESCRIPTION OF THE DRAWING

The subject invention will hereinafter be described in conjunction with the appended drawing figure, wherein the reference numerals in the drawing figure correspond to he associated descriptions provided below, and the drawing figure is a schematic block diagram of a method for efficiently allocating network resources based on current user parameters in accordance with a preferred embodiment of the present invention.

DETAILED DESCRIPTION OF THE DRAWING

The efficiency of a Demand Assigned Multiple Access (DAMA) communications network depends on the particular strategies employed in assigning communication resources. Simpler strategies often result in tying up unused resources in order to guarantee quality of service for priority users, which results in inefficiencies associated with the "reserved" resources. To reduce these inefficiencies, the present invention predicts the likelihood of future access demand from users and makes resource allocation decisions based on a combination of the predicted demand and other metrics.

In accordance with a preferred embodiment of the present invention, demand prediction employs the following two steps: (1) parameters of the statistic distribution of the traffic pattern of each user are adaptably estimated based on the users "duty cycle," i.e., the active and inactive states of the user equipment; and (2) the probability of the active and inactive duration of each user is calculated using the estimated parameters. Other metrics may also be employed in the resource allocation decision, such as user service priority, available network resources and the like.

The drawing figure is a schematic block diagram of the network system 100 including a network resource manager 110 and a plurality of network users represented by respective devices 102, 104, and 106, each of which may include a buffer 107. By way of example, device 102 may be a cellular telephone, device 104 may be a network personal computer (PC), and device 106 may be, for example, a personal digital assistant (PDA) device, all of which compete for bandwidth from the network.

Network resource manager 110 includes a demand history database 112, a demand prediction processor 114, a cost function database 116, a resource pool 118, a decision history database 120 and a network resource allocator 122.

For purposes of this discussion, the time period in which a device is active is denoted as $T_{ON}$ which is followed by a time period in which a device is inactive, denoted as $T_{OFF}$. The present inventors have determined that, in the aggregate, $T_{ON}$ and as $T_{OFF}$ for traffic in typical data networks often exhibit characteristics of heavily tailed distribution, which may be modeled as for example, a Pareto distribution. Although the techniques described herein work well in the context of a Pareto distribution, the present invention may be employed in the context of virtually any statistical distribution, for example, Weibull, Possion and the like. The Pareto distribution is given by:

Probability density function: $\quad f(x|\forall,\exists) = \exists \forall^\exists (x)^{-(\exists+1)}$
Cumulative distribution function: $\quad F(x) = P(X < x) = 1 - (\forall/x)^\exists$ Where $\forall$ is the location parameter and $\exists$ is the shape parameter of the distribution.

In accordance with one aspect of the present invention, each device 102, 104 and 106 keeps track of the duration of the $T_{ON}$ and $T_{OFF}$. The parameters $\forall$ and $\exists$ of the distribution of $T_{ON}$ may be estimated by an adaptive process using each duration sample of $T_{ON}$. Similarly, the parameters $\forall$ and $\exists$ of the distribution of $T_{OFF}$ may be estimated based on $T_{OFF}$ samples. In the context of the drawing figure, this task may be performed by distribution parameter estimator 108 associated with each device. When a device, for example, device 102, requests network access, it sends the distribution parameters (e.g., $\forall$ and $\exists$) along with the request for network access to network resource manager 110.

Network resource manager 110 stores the distribution parameters of each user, for example, in demand prediction processor 114. When network resource manager 110 receives access requests from active users, it uses the parameters received to estimate the probability $P(T_{ON}>t+)t)$ that the traffic's active period will last longer than a time period t+)t. The probabilities $P(T_{OFF}<t+)t)$ for all inactive users are also updated using the most current saved parameters. The probability calculations may be carried out for multiple values of)t, to thereby allow the predictions of future user traffic to range from, for example, on the order of milliseconds, to seconds or even minutes. Demand prediction processor 114 outputs these estimated probabilities and applies this output to network resource allocator 122.

These estimated probabilities are applied to network resource allocator 122, along with the output of demand history database 112 (which may include such information as service priority, grade of service, delay, and the like), decision history database 120, resource pool 118, and cost function database 116.

Network resource allocator 122 then processes this information and applies signals to devices 102, 104 and 106 indicative of the network resource allocation decisions. Network resource allocator 122 also applies the allocation decisions to decision history database 120. This historical information may be helpful in ensuring that all devices are given a fair amount of resources in view of the priorities associated with each device.

By using the probabilities of the active and inactive time periods of the traffic patterns for each of respective devices 102, 104 and 106, a "look ahead" scheme may be employed to predict the likelihood of each user's activity and use this information to make network resource allocation decisions.

By way of further illustration, if a particular user is a low-priority user, and makes a request to a network for higher-priority service, the use of the techniques described herein permit the network resource manager to predict whether the amount of time a particular user will likely consume high-priority network resources is greater than or less than the time period during which those high-priority network resources are likely to be available. Accordingly, highly efficient utilization of network resources and bandwidth results.

In accordance with one embodiment of the invention, to preserve or enhance a quality of service provided to high-priority users, the method described above may include a preemptive process, which is used in connection with the DAMA communication system described herein. The preemption process is suitably configured to allow a low-priority user service to be preempted by a high-priority user if the high-priority user requests service, and no resources are available.

Although the present invention has been described with reference to the drawing figure, those skilled in the art will appreciate that the scope of the invention is not limited to the specific forms shown in the figure. Various modifications, substitutions, and enhancements may be made to the descriptions set forth herein, without departing from the spirit and scope of the invention which is set forth in the appended claims.

What is claimed is:

1. In a communications network having a plurality of devices competing for network resources, a method for allocating the network resources comprising the steps of:

receiving at a network resource manager, from each of said plurality of devices, a request for network access, a first set of distribution parameters for the distribution of time when the device is active and a second set of distribution parameters for the distribution of the periods of time the device is inactive;

predicting whether sufficient network resources exist to accommodate said request based on the first set of distribution parameters and the second set of distribution parameters for each of said plurality of devices; and allocating the network resources in accordance with said prediction.

2. The method of claim 1, further comprising transmitting, from said network resource manager to said plurality of devices, information indicative of the allocation of the network resources.

3. The method of claim 1, wherein said step of allocating network resources comprises allocating network resources in a cellular telephone network and further wherein said plurality of devices comprise a corresponding plurality of cellular telephones.

4. The method of claim 1, further comprising providing a preemption process to allow a high-priority device to preempt service from a low-priority device.

5. A network resource manager for allocating network resources comprising:

a demand prediction processor operable to store for each of a plurality of devices coupled to the network resource manager a first set of distribution parameters associated with the distribution of the period of time when the device is active and a second set of distribution parameters associated with the distribution of the periods of time when the device is inactive, the demand prediction processor further operable to calculate, upon receiving a request for network access, an estimated probability of whether each of the plurality of devices will be active or inactive; and a network allocator coupled to the demand processor, the network allocator operable to receive the estimated probability and to generate network resource allocation decisions based on the estimated probability.

6. The network resource manager of claim 5, wherein the network resource allocation decisions are sent to each of the plurality of devices.

7. The network resource manager of claim 5 wherein the network resource allocation decisions are stored in a decision history database coupled to the network allocator.

* * * * *